(12) United States Patent
Shanahan

(10) Patent No.: US 7,243,771 B2
(45) Date of Patent: Jul. 17, 2007

(54) CLUTCH ASSIST MECHANISM INCLUDING KIT AND METHOD OF UTILIZING MECHANISM

(76) Inventor: William F. Shanahan, 2306 S. 3rd St., Philadelphia, PA (US) 19148

(*) Notice: Subject to any disclaimer, the term of this patent is extended or adjusted under 35 U.S.C. 154(b) by 167 days.

(21) Appl. No.: 11/031,285

(22) Filed: Jan. 7, 2005

(65) Prior Publication Data
US 2006/0150764 A1    Jul. 13, 2006

(51) Int. Cl.
    *F16D 25/12* (2006.01)
    *G05G 1/04* (2006.01)
(52) U.S. Cl. ........................ 192/99 S; 74/525
(58) Field of Classification Search ........... 74/502.2, 74/525, 544
    See application file for complete search history.

(56) References Cited

U.S. PATENT DOCUMENTS

| | | | |
|---|---|---|---|
| 1,569,063 A * | 1/1926 | Zolla | 74/544 |
| 1,769,756 A | 7/1930 | Schaefer | |
| 1,937,471 A | 11/1933 | Dean et al. | |
| 4,635,442 A | 1/1987 | Bass | |
| 5,040,432 A * | 8/1991 | Carlstedt | 74/544 |
| 5,299,466 A * | 4/1994 | Heilbron et al. | 74/502.2 |
| 5,448,927 A | 9/1995 | Lumpkin | |
| 5,515,743 A | 5/1996 | Lumpkin | |
| 5,528,954 A | 6/1996 | Yoshigai | |
| 5,775,168 A | 7/1998 | Furuta | |
| 6,263,754 B1 | 7/2001 | Wesling et al. | |
| 6,494,113 B1 * | 12/2002 | Hancock et al. | 74/544 |
| 6,739,133 B2 | 5/2004 | Barnett | |
| 2001/0022114 A1 | 9/2001 | Brainard | |
| 2004/0173045 A1 * | 9/2004 | Hancock et al. | 74/544 |
| 2005/0011300 A1 * | 1/2005 | Gates | 74/544 |

* cited by examiner

*Primary Examiner*—Richard M Lorence
(74) *Attorney, Agent, or Firm*—Robert B. Famiglio; Famiglio & Associates

(57) ABSTRACT

A clutch assist mechanism for reducing the amount of application force required to actuate a hand clutch of a vehicle. A clutch lever of the hand clutch is pivotable about a pivot axis and the vehicle includes a handle grip. The clutch assist mechanism includes a telescopic bar having a terminal end. The telescopic bar is movably mounted to the hand clutch generally parallel to a longitudinal hand clutch axis. The terminal end is movable between a withdrawn position and an extended position. The terminal end is located a first distance from the pivot axis in the withdrawn position and a second distance from the pivot axis in the extended position. The second distance is greater than the first distance. A mounting mechanism movably mounts the telescopic bar to the hand clutch.

8 Claims, 3 Drawing Sheets

CLUTCH ASSIST MECHANISM INCLUDING KIT AND METHOD OF UTILIZING MECHANISM

BACKGROUND OF THE INVENTION

The present invention relates to a clutch assist mechanism for a hand clutch and, more particularly, to a telescopic bar mounted to a lever of the hand clutch to reduce the amount of force required to actuate the hand clutch of a vehicle.

Conventional hand clutches include a pivotable lever mounted to the vehicle, typically the vehicle handle adjacent a handgrip. For example, a motorcycle typically includes a pivotable lever mounted to one of the handlebars adjacent the handgrip. The pivotable lever is biased to a relaxed position, pivotably distanced from the handgrip. To actuate the hand clutch, the pivotable lever is grasped by a user's fingers and pulled or pivoted toward the handgrip to pull on a hand clutch wire and actuate the clutch. When the hand clutch is actuated, the clutch is disengaged such that the gear of the vehicle may be changed. The pivotable clutch lever has a fixed length and the wire often encounters resistance when sliding through a protective sheathing that the wire is housed within. Accordingly, as the wire encounters increasing resistance, the force required to actuate the clutch by pulling with a user's fingers often increases. In addition, the wire often encounters additional resistance as the vehicle heats up during use. On long trips, the increased force required to actuate the hand clutch and frequent shifting often fatigues a rider's hand and may lead to rider error or physical damage to a rider's hand or arm.

It would be desirable to construct a hand clutch that is able to vary the amount of force that a user is required to apply to the lever to actuate the clutch. The clutch assist mechanism of the present invention provides a telescopic bar mounted to the hand clutch lever to vary the amount of force required to actuate the hand clutch.

BRIEF SUMMARY OF THE INVENTION

The present application is directed to a clutch assist mechanism for reducing the amount of force required to actuate a hand clutch of a vehicle. A clutch lever of the hand clutch is pivotable about a pivot axis. The vehicle includes a handle grip and the clutch assist mechanism includes a telescopic bar having a terminal end. The telescopic bar is movably mounted to the hand clutch, generally parallel to a longitudinal hand clutch axis. The terminal end of the telescopic bar is movable between a withdrawn position and an extended position. The terminal end is located a first distance from the pivot axis in the withdrawn position and a second distance from the pivot axis in the extended position. The second distance is greater than the first distance. The clutch assist mechanism also includes a mounting mechanism movably mounting the telescopic bar to the hand clutch.

In another aspect, the present application is directed to a clutch assist kit for mounting to a hand clutch of a vehicle to reduce the amount of application force required for engaging the hand clutch. The clutch assist kit includes a mounting bracket, a mounting cord and a rod movably mountable to the hand clutch. The rod is slidably mounted to the mounting bracket and the mounting cord secures the mounting bracket to the hand clutch in a mounted position. The rod is movable, generally parallel to a hand clutch axis, in a mounted position between extended and withdrawn positions.

In yet another aspect, the present application is directed to a method for mounting a clutch assist mechanism to a hand clutch of a vehicle that is pivotable about a pivot axis and utilizes the clutch assist mechanism to vary the amount of an application force required to actuate the hand clutch. The vehicle includes a handle grip associated with the hand clutch. The method for mounting the clutch assist mechanism includes the steps of mounting a bar to the hand clutch such that the bar is movable, generally parallel to a hand clutch axis and moving the bar between a withdrawn position and an extended position to vary the amount of application force required to actuate the hand clutch.

BRIEF DESCRIPTION OF THE SEVERAL VIEWS OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1:
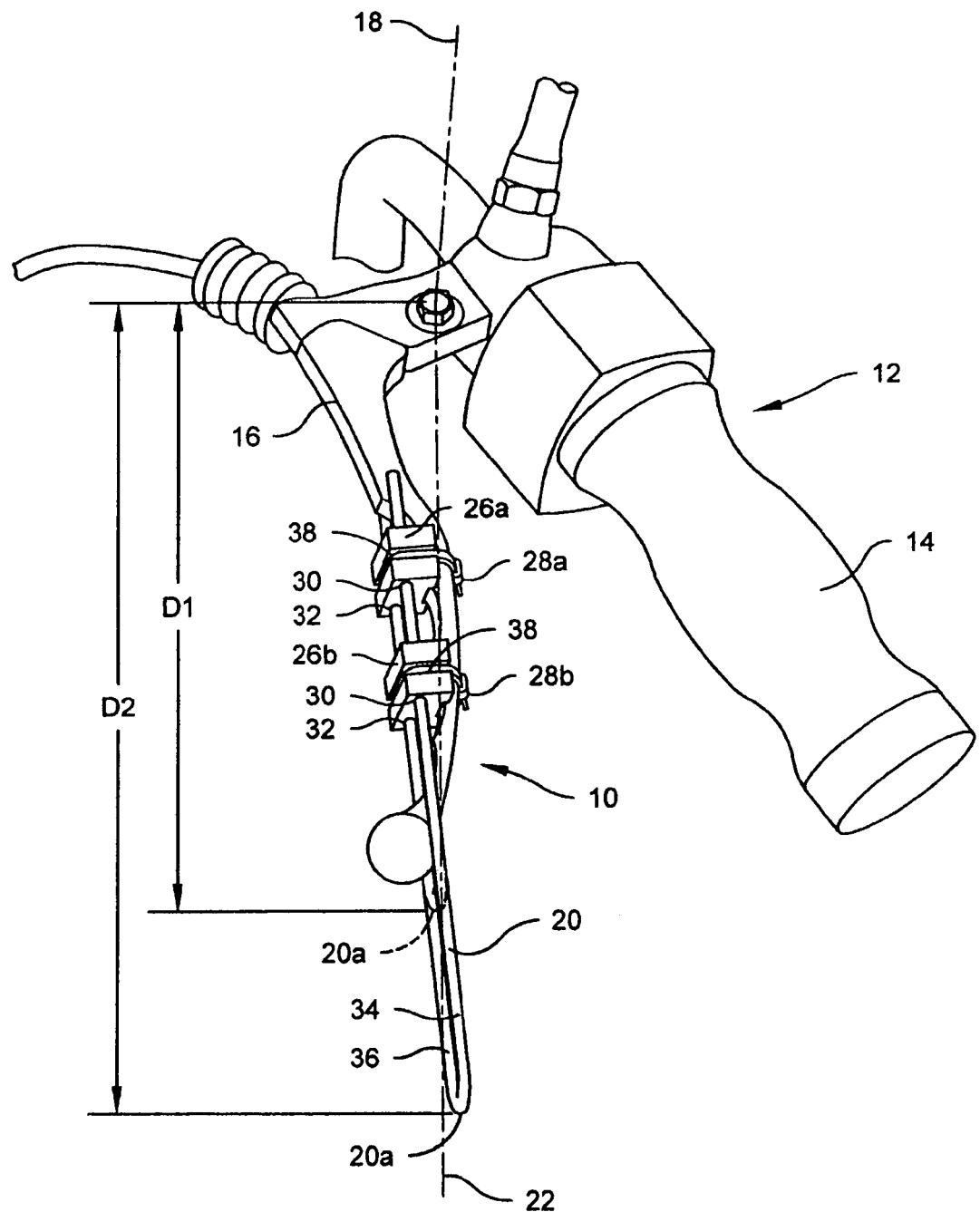
FIG. 1 is a top perspective view of a conventional hand clutch with a clutch assist mechanism mounted thereto in accordance with a preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the clutch assist mechanism and designated parts thereof. The terminology uses the above-listed words, derivatives thereof and words of similar import.

Figure 2:
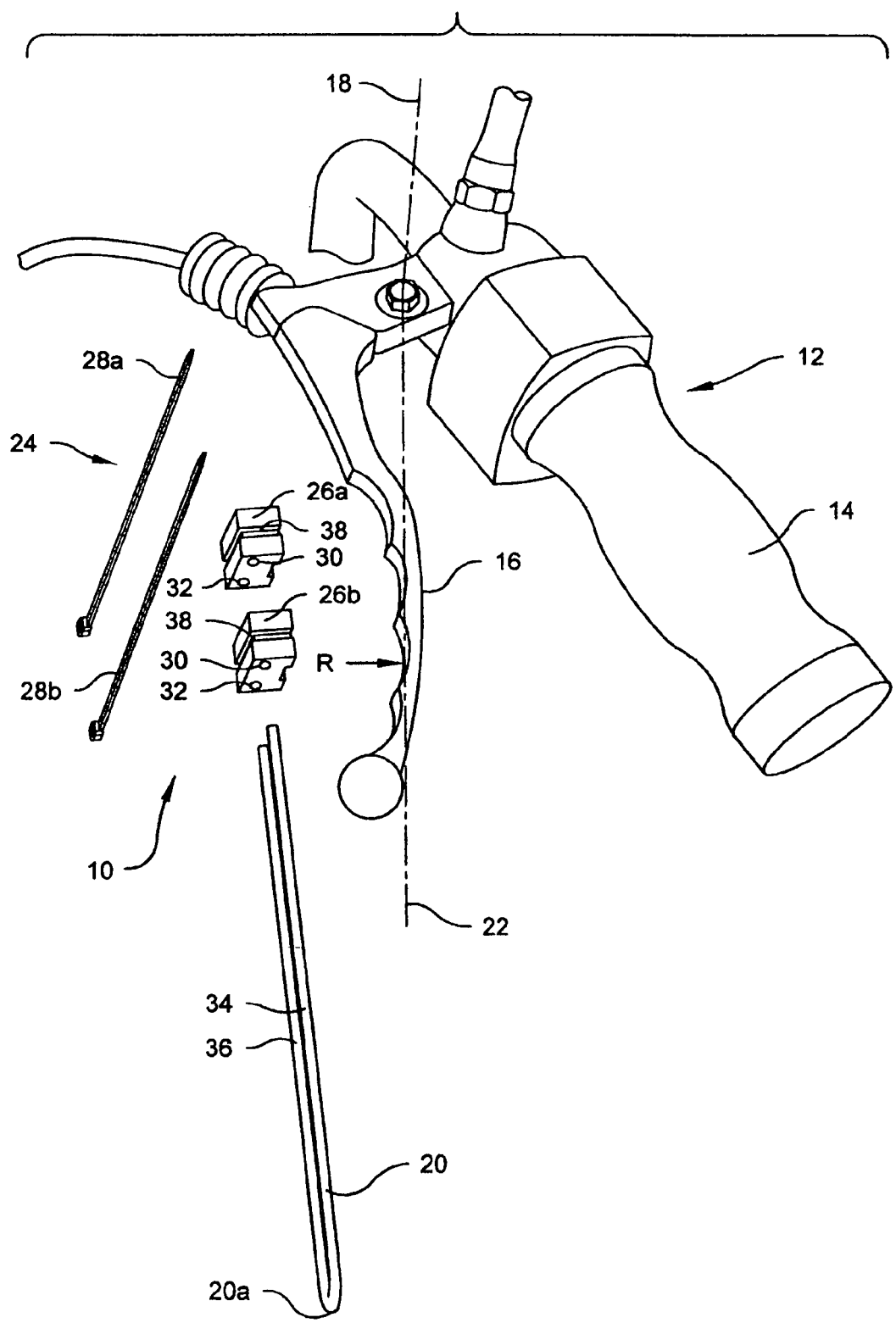
FIG. 2 is a partially exploded perspective view of the clutch assist mechanism and hand clutch of FIG. 1.
Figure 3:
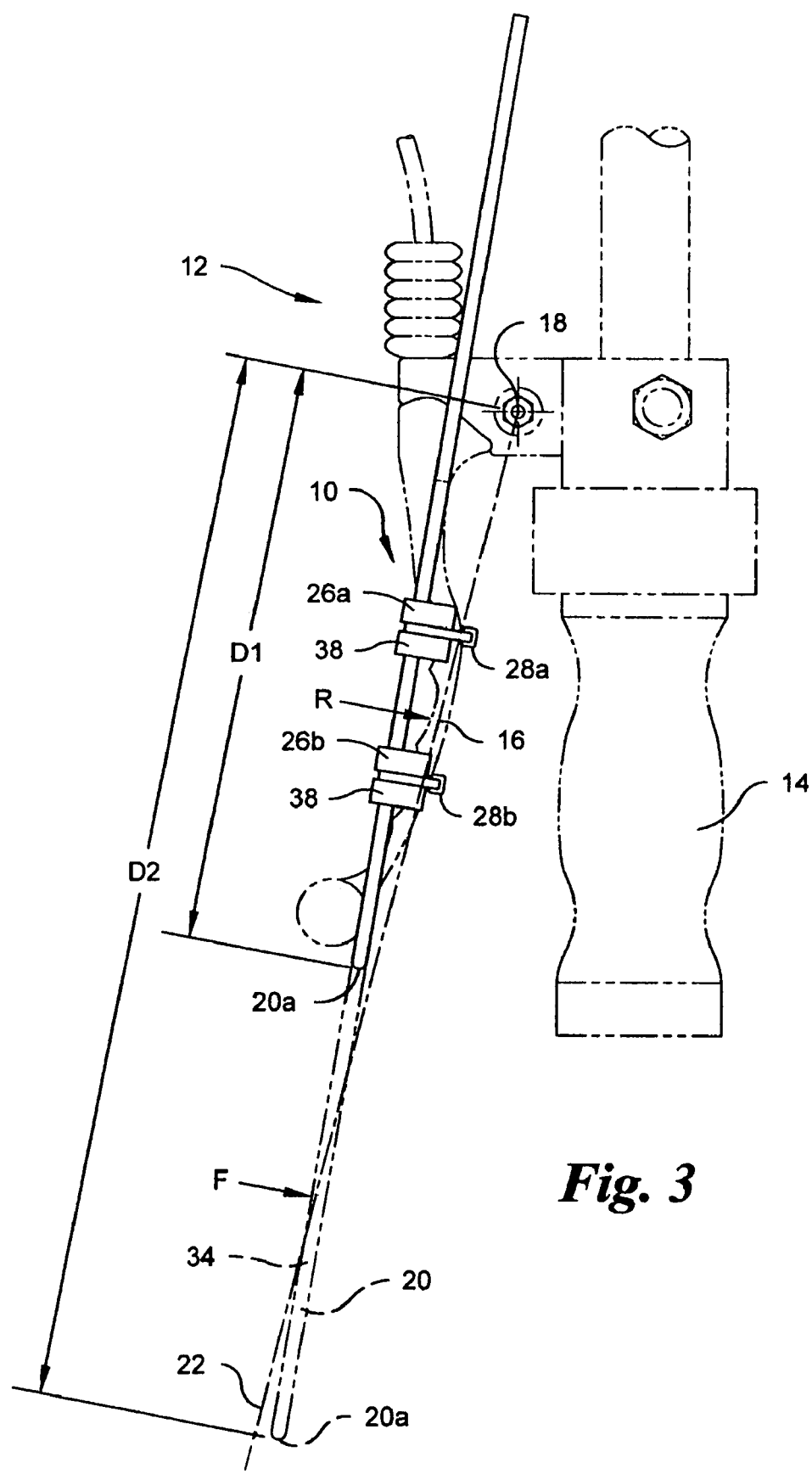
FIG. 3 is a top perspective view of the hand clutch with the clutch assist mechanism of FIG. 1 mounted thereto.

Referring to the drawings in detail, wherein like numerals indicate like elements throughout, there is shown in FIGS. 1-3 a preferred embodiment of a clutch assist mechanism, generally designated 10, for reducing the amount of force required to actuate a hand clutch 12 of a vehicle. The conventional hand clutch 12 typically includes a handle grip 14 and a clutch lever 16 that is pivotable about a pivot axis 18. The conventional hand clutch 12 is actuated by applying a force R to the clutch lever 16 toward the handle grip 14 such that the clutch lever 16 pivots about the pivot axis 18. One having ordinary skill in the art will realize that the clutch assist mechanism 10 is not limited to being associated with the hand clutch 12 shown in FIGS. 1-3 and may be associated with nearly any type of clutch that is actuated by applying a force to a lever that pivots about a pivot axis.

The clutch assist mechanism 10 includes a telescopic bar 20 having a terminal end 20a. The telescopic bar 20 is movably mounted to the clutch lever 16, generally parallel to a longitudinal hand clutch axis 22. In the preferred embodiment, the telescopic bar 20 has a generally elongated U-shape and a closed end of the telescopic bar 20 is proximate the terminal end 20a. In addition, the telescopic bar 20 is preferably constructed of a rigid metallic material. One having ordinary skill in the art will realize that the telescopic bar 20 is not limited to having a U-shape or to being constructed of a metallic material. For example, the telescopic bar 20 may be constructed of a generally rigid polymeric material having a generally rod-shape.

The terminal end 20a of the telescopic bar 20 is movable between a withdrawn position and an extended position when the bar 20 is mounted to the clutch lever 16. The terminal end 20 is located a first distance D1 from the pivot axis 18 in the withdrawn position (dashed in FIGS. 1 and 3) and a second distance D2 from the pivot axis 18 in the extended position (solid FIGS. 1 and 3). The second distance D2 is greater than the first distance D1(D2>D1). In the preferred embodiment, the first distance D1 is approximately ten inches (10") and the second distance D2 is approximately twenty-four inches (24"). The first and second distances D1, D2 are not limited to the above-listed values and may have nearly any value depending upon the configuration of the hand clutch 12. The above-listed dimensions are provided as a typical reference for a motorcycle hand clutch 12.

The clutch assist mechanism 10 also includes a mounting mechanism 24 that movably mounts the telescopic bar 20 to the hand clutch 12. In the preferred embodiment, the mounting mechanism 24 movably mounts the telescopic bar 20 to the clutch lever 16 of the hand clutch 12. The mounting mechanism 24 is preferably comprised of first and second brackets 26a, 26b and first and second mounting cords 28a, 28b. The first and second brackets 26a, 26b are secured to the hand clutch 12 by pressure applied from the first and second mounting cords 28a, 28b. The mounting mechanism 24 is not limited to the inclusion of the first and second mounting brackets 26a, 26b and the first and second mounting cords 28a, 28b and may be comprised of nearly any mounting device that is able to mount the bar 20 to the hand clutch 12 such that the bar 20 is movable between the extended and withdrawn positions. For example, the bar 20 may be slidably mounted within the clutch lever 16 (not shown) such that the bar 20 is telescopically extendable within and from a terminal end of the clutch lever 16.

Referring to FIGS. 1 and 2, in the preferred embodiment, each of the first and second mounting brackets 26a, 26b include first and second spaced apart holes 30, 32 therein. In addition, the preferred U-shaped telescopic bar 20 includes first and second legs 34, 36 that are slidably positioned within the first and second holes 30, 32, respectively. The first and second holes 30, 32 extend completely through the first and second mounting brackets 26a, 26b, generally parallel to the hand clutch axis 22, in the mounted position. The first and second legs 34, 36 are preferably slidably and press-fit into the first and second holes 30, 32. The telescopic bar 20 is preferably fit into the holes 30, 32 such that the bar 20 is selectively movable between the extended and withdrawn positions, and any position therebetween, relative to the clutch lever 16. Accordingly, the user may move the bar 20 to and between the withdrawn and extended positions, as is desired. In addition, the user may remove the bar 20 from the first and second mounting brackets 26a, 26b by pulling the bar 20 away from the clutch lever 16 along the hand clutch axis 22. As was described above, the mounting brackets 26a, 26b are not limited to the inclusion of the first and second holes 30, 32 and the bar 20 is not limited to the inclusion of the first and second legs 34, 36. In addition, the bar 20 may be otherwise mounted to the clutch lever 16 such that the bar 20 is movable between the withdrawn and extended positions.

In the preferred embodiment, the first and second brackets 26a, 26b are constructed of a generally rigid, polymeric material and the first and second cords 28a, 28b are comprised of flexible, polymeric one-way ties that are generally well known in the art. The mounting brackets 26a, 26b and the mounting cords 28a, 28b are not limited to constructions utilizing the above-described rigid, polymeric material and the flexible, polymeric ties and may be constructed of nearly any material that is able to take on the general shape of the brackets 26a, 26b and cords 28a, 28b and withstand their normal operating conditions. The above-described materials are preferred for the mounting brackets 26a, 26b and the mounting cords 28a, 28b due to their general ease of manufacture, resistance to corrosion and ability to take on the general shape and perform the typical functions of the brackets 26a, 26b and cords 28a, 28b. The clutch assist mechanism 10 may be provided as a clutch assist kit for mounting to the hand clutch 12 of the vehicle to reduce the amount of application force required to actuate the hand clutch 12. The clutch assist kit preferably includes the mounting brackets 26a, 26b, the mounting cords 28a, 28b and the rod 20. When provided in kit form, the clutch assist mechanism 10 may be easily adapted to typical vehicle hand clutches 12.

Referring to FIGS. 1-3, the clutch assist mechanism 10 is mounted to the hand clutch 12 such that the rod 20 is movable between the withdrawn and extended positions to vary the amount of application force required to actuate the hand clutch 12. For example, utilizing the clutch lever 16, the user typically applies the application force R using their fingers, which is generally centered along the length of the clutch lever 16. In contrast, when the telescopic bar 20 is moved to the extended position, an extended force F may be applied to the bar 20 that is centered further away from the pivot axis 18 than the typical force R. Accordingly, a user is required to apply a lesser force for the extended force F when compared to the typical force R, due to the greater leverage afforded the extended force F, to actuate the hand clutch 12. That is, the greater leverage provided by the bar 20 in the extended position reduces the amount of force F required to actuate the hand clutch 12. As will be understood by one having ordinary skill in the art, when the hand clutch 12 is actuated, the vehicle clutch is disengaged such that the gear of the vehicle may be changed.

In the preferred embodiment, the bar 20 is slidably mounted to the clutch lever 16 of the hand clutch 12 by mounting the mounting brackets 26a, 26b with the first and second holes 30, 32 therein on the clutch lever 16 using the first and second mounting cords 28a, 28b such that the first and second holes 30, 32, respectively, are generally aligned with the hand clutch axis 22. The mounting brackets 26a, 26b are preferably placed onto a surface of the clutch lever 16 facing away from the handle grip 14 such that the holes 30, 32 are aligned with the axis 22. The first and second mounting cords 28a, 28b are wrapped around the first and second mounting brackets 26a, 26b and the clutch lever 16 and are tightened over the mounting brackets 26a, 26b. The brackets 26a, 26b preferably include a cord alignment groove 38 that generally aligns the cords 28a, 28b relative to the brackets 26a, 26b and typically prevents the cords 28a, 28b from sliding off of the brackets 26a, 26b during use. The first and second legs 34, 36 of the bar 20 are then inserted into the first and second holes 30, 32, respectively, such that the bar 20 is slidably mounted to the clutch lever 16 of the hand clutch 12. In the preferred embodiment, the bar 20 may be moved to the extended position and the extended force F may be applied to the bar 20 adjacent the terminal end 20a, generally perpendicular to the hand clutch axis 22 or toward the handle grip 14. The extended force F urges the clutch lever 16 toward the clutch actuated position of the hand clutch 12. As was described above, the use of the bar 20 in the extended position, reduces the amount of force required to actuate the hand clutch 12 due to the additional leverage provided by the bar 20.

When using the preferred clutch assist mechanism 10, the user may position the bar 20 in the extended position, grasp the handle grip 14 with a portion of the user's thumb, grasp the bar 20 with a portion of the user's fingers and draw the clutch lever 16 toward the clutch actuated position by squeezing the user's fingers toward the user's thumb. As is obvious to one having ordinary skill in the art, the required clamping force between the fingers and thumb is typically less when utilizing the bar 20 in the extended position when compared to applying the force utilizing only the clutch lever 16. Accordingly, during long trips or when the force required to actuate the hand clutch 12 becomes relatively high, the usage of the clutch assist mechanism 10 reduces the stress on the user by reducing the amount of force required to actuate the hand clutch 12.

The clutch assist mechanism 10 may also be utilized by positioning the bar 20 in the extended position, grasping the bar 20 with a portion of the user's fingers, holding the handle grip 14 in a stationary position and drawing the bar 20 toward the clutch actuated position by applying the extended force F to the bar 20, generally toward the handle grip 14 and perpendicular to the hand clutch axis 22. The hand grip 14 is typically held in a stationary position by a user's opposite hand by engaging and holding an opposite end of the handle of the vehicle. The user's thumb is not necessarily utilized to actuate the hand clutch 12 when utilizing the telescopic bar 20. Accordingly, when the hand clutch 12 becomes particularly difficult to actuate, the user may gain a maximum amount of leverage by applying the extended force F proximate the terminal end 20a of the telescopic bar 20 in the extended position. Applying the extended force F in this manner provides a relatively long lever arm for pivoting the clutch lever 16 to the actuated position.

It will be appreciated by those skilled in the art that changes could be made to the embodiments described above without departing from the broad inventive concept thereof. For example, the telescopic bar 20 may be comprised of a rod that is slidably mounted within or on the clutch lever 16 and movable between the withdrawn and extended positions. It is understood, therefore, that this invention is not limited to the particular embodiment disclosed, but is intended to cover modifications within the spirit and scope of the present invention as defined by the appended claims.

I claim:

1. A clutch assist kit for mounting to a hand clutch of a vehicle to reduce the amount of application force required for engaging the hand clutch, the clutch assist kit comprising: a mounting mechanism and a generally U-shaped bar movably mountable to the hand clutch, the bar being slidably mounted to the mounting mechanism and movable generally parallel to a hand clutch axis in a mounted position between extended and withdrawn positions.

2. The clutch assist kit of claim 1 wherein the mounting mechanism comprises a mounting bracket and at least one mounting cord.

3. The clutch assist kit of claim 2 wherein the mounting bracket includes a first hole and a second hole therein and the U-shaped bar has a first leg and a second leg slidably mounted in the first and second holes, respectively, in the mounted position, and the first and second holes and first and second legs being generally positioned parallel to the hand clutch axis in the mounted position.

4. The clutch assist kit of claim 1 wherein the mounting mechanism is constructed of a polymeric material.

5. The clutch assist kit of claim 1 wherein the bar is constructed of a metallic material.

6. A clutch assist mechanism for reducing the amount of application force required to actuate a hand clutch of a vehicle, a clutch lever of the hand clutch being pivotable about a pivot axis, the vehicle including a handle grip, the clutch assist mechanism comprising: a telescopic bar having a terminal end, the telescopic bar being movably mounted to the hand clutch generally parallel to a longitudinal hand clutch axis, the terminal end being movable between a withdrawn position and an extended position, the terminal end being located a first distance from the pivot axis in the withdrawn position and a second distance from the pivot axis in the extended position, the second distance being greater than the first distance; and a mounting mechanism movably mounting the telescopic bar to the hand clutch; wherein the telescopic bar has a generally elongated U-shape, a closed end of the telescopic bar being proximate to the terminal end; wherein further the mounting mechanism includes the first and second brackets and first and second mounting cords, the first and second brackets being secured to the clutch lever of the hand clutch by pressure applied by the first and second mounting cords; wherein further each of the first and second mounting brackets include first and second holes therein, first and second legs of the U-shaped telescopic bar being slidably positioned within the first and second holes, respectively, the first and second holes being generally parallel to the hand clutch axis in a mounted position.

7. A method for mounting a clutch assist mechanism to a clutch lever of a hand clutch of a vehicle that is pivotable about a pivot axis, the vehicle having a handle grip associated with the hand clutch, the method comprising mounting a bar to the hand clutch such that the bar is movable generally parallel a hand clutch axis; wherein further the bar is generally U-shaped with a first and second leg and is slidably mounted to the clutch lever of the hand clutch by:

i) mounting a mounting bracket with first and second holes therein on the clutch using a mounting cord such that the first and second holes are generally aligned with the hand clutch axis; and ii) inserting first and second legs of the bar into the first and second holes such that the bar is slidably mounted to the clutch lever.

8. The method of claim 7 wherein the mounting bracket is mounted to the hand clutch in step (i) by engaging the mounting bracket and clutch lever with a mounting cord.

* * * * *